US010533689B2

(12) United States Patent
Plantz, Jr.

(10) Patent No.: US 10,533,689 B2
(45) Date of Patent: Jan. 14, 2020

(54) DOUBLE WALL DUCT CONNECTOR

(71) Applicant: Ductmate Industries, Inc., Monongahela, PA (US)

(72) Inventor: Anton R. Plantz, Jr., Jefferson Hills, PA (US)

(73) Assignee: Ductmate Industries, Inc., Monongahela, PA (US)

( * ) Notice: Subject to any disclaimer, the term of this patent is extended or adjusted under 35 U.S.C. 154(b) by 287 days.

(21) Appl. No.: 15/718,196

(22) Filed: Sep. 28, 2017

(65) Prior Publication Data

US 2018/0087700 A1    Mar. 29, 2018

Related U.S. Application Data

(60) Provisional application No. 62/400,870, filed on Sep. 28, 2016.

(51) Int. Cl.
| F16L 23/04 | (2006.01) |
| F16L 39/00 | (2006.01) |
| F24F 13/02 | (2006.01) |
| F16L 13/10 | (2006.01) |

(52) U.S. Cl.
CPC ........... *F16L 39/005* (2013.01); *F16L 13/103* (2013.01); *F16L 23/04* (2013.01); *F24F 13/0209* (2013.01)

(58) Field of Classification Search
CPC ..... F24F 13/0209; F16L 13/103; F16L 23/04; F16L 23/14

USPC ......................................................... 285/424
See application file for complete search history.

(56) References Cited

U.S. PATENT DOCUMENTS

| 4,558,892 A | * | 12/1985 | Daw | F24F 13/0209 285/331 |
| 5,133,580 A | * | 7/1992 | Meinig | F24F 13/0209 285/363 |
| 5,135,270 A | * | 8/1992 | Arnoldt | F24F 13/0209 285/363 |
| 5,352,000 A | * | 10/1994 | Issagholian-Havai | F24F 13/0209 285/405 |
| 6,298,555 B1 | * | 10/2001 | Vincenti | F24F 13/0209 138/DIG. 4 |
| 2003/0160452 A1 | * | 8/2003 | Mattsson | F24F 13/0209 285/424 |

* cited by examiner

*Primary Examiner* — David Bochna
(74) *Attorney, Agent, or Firm* — The Webb Law Firm

(57) ABSTRACT

A double wall round or oval duct system assembly having an outer duct connector, an inner duct connector and a closure ring is provided. The inner duct connector of the duct assembly has an adhesive applied on the transverse flange face of its transverse flange thus allowing a sealing connection between the inner and outer duct connectors upon compression with the closure ring. The double wall round or oval duct system assembly will improve the efficiency and will reduce or eliminate air leakage upon connection of two round or oval duct segments. A method of installing the assembly system is also provided.

21 Claims, 6 Drawing Sheets

DOUBLE WALL DUCT CONNECTOR

CROSS-REFERENCE TO RELATED APPLICATIONS

The present application claims the benefit of U.S. Provisional Application No. 62/400,870, filed on Sep. 28, 2016, and which is incorporated by reference herein.

BACKGROUND OF THE INVENTION

Field of the Invention

This invention relates to a method and apparatus for connecting double wall round and oval duct segments used in the heating, ventilating, exhaust and/or air conditioning fields.

Description of Related Art

Double wall ducts having round or oval cross sectional shape are used to transport heated or cooled air or other gasses from one place to another. A typical example is when heated or cooled air from an air conditioner or furnace is transported to individual locations by a system of ducts, which includes ducts segments connected to each other at their ends. When adjacent duct segments are connected, flanges, collar, clamps, sleeves, and other removable fastening methods have been used.

Double wall, insulated duct work is used when insulation is desired within a duct system. For double wall duct work, connectors have been used that possess adjacent flanges thereby providing rigidity across the connection. Duct segments often have cross-sections of varying dimensions. Thus, when adjacent double wall duct segments are connected with solid continuous double-flanged connectors, it may be difficult to provide a good connection between ducts having different cross-sectional dimensions or diameters. This is often times due to tolerance variations between both the duct connector and duct segment manufacturers In contrast, when non-flanged connectors are used to connect circular or oval adjacent duct segments, the resulting connection may result in the bending or loss of shape at the connection.

Attaching connectors to duct work segments often involves the use of heat such as via welding. If the connection also requires the use of a sealant material at the connector and duct work segment, the use of heat may result in the melting or dripping of the sealant.

When this occurs with these types of connectors, they may not be effective at maintaining the forced air inside the duct, i.e., without leaking through the connection.

Accordingly, there is a need for an improved double wall duct connector for round or oval duct work systems, which does not require rigid connector pieces, which maintain the original round or oval duct shape, and which does not require the use of heat to make the connection to install the connector piece.

BRIEF SUMMARY OF THE INVENTION

This invention provides an apparatus for assisting in the connection of adjacent double wall round or oval duct segments. The apparatus comprises outer round or oval duct connectors each having an inner leg, at least one vertex and an outer transverse flange on at least one end of each outer duct segment. The outer transverse flange extends substantially perpendicularly from the inner leg and has a transverse flange mating face directed away from the inner leg. The apparatus also comprises inner round or oval duct connector each having an inner leg, at least one vertex and an inner transverse flange on the at least one end of each inner duct segment. The inner transverse flange substantially circumscribes the associated end and extends substantially perpendicularly from the inner leg and having a transverse flange face directed toward the inner leg. An adhesive is dispensed on the transverse flange face of the inner transverse flange. The apparatus further comprises a closure ring placed over the outer transverse flanges and inner transverse flanges of mating duct connectors with the transverse flange face of the inner transverse flange and the transverse flange mating face of the outer transverse flange being maintained in contact by the adhesive.

This invention also provides for a method for connecting adjacent double wall round or oval duct segments. The method of the present invention comprises providing double wall round or oval duct segments in need of connection. The method of the present invention further comprises providing outer round or oval duct connectors each having an inner leg, a leading edge, vertex and an outer transverse flange on one end of each outer duct segment. The outer transverse flange extends substantially perpendicularly from the inner leg and has a transverse flange mating face directed away from the inner leg. The method further comprises providing inner round or oval duct connectors each having an inner leg, a leading edge, a vertex and one inner transverse flange on one end of each inner duct segment. The inner transverse flange substantially circumscribes the associated end and extends substantially perpendicularly from the inner leg. The inner transverse flange has a transverse flange face directed toward the inner leg and an adhesive is disposed on its face. The method further comprises the step of inserting the leading edge of the outer duct connectors in the round or oval duct segments in need of connection. The method then provides the step of inserting the leading edge of the inner duct connectors in the round or oval duct segments in need of connection. The method also comprises abutting the outer transverse flange of the outer duct connector to the adhesive of the inner transverse flange of the inner duct connector to substantially align the inner volumes of the adjacent duct segments. The method further comprises placing a closure ring over the inner transverse flanges and outer transverse flanges of mating duct connectors with the transverse flange face of the inner transverse flange and the transverse flange mating face of the outer transverse flange being put in contact by the adhesive, the closure ring comprising fastening means. The method further comprises fastening the closure ring to form a seal between the inner and outer duct sections.

This invention also provides a double wall round or oval duct connector that is easy for an installer to use and that provides adequate connection between adjacent insulated round or oval duct segments. More particularly, the present invention provides a universal, self-contained, tool or fastener free design and incorporates a rapid-bonding, self-sealing insulation shield and connector design for double wall round or oval HVAC duct. The corresponding method of installing such a double wall round or oval duct connector is also provided.

DETAILED DESCRIPTION

As used herein, a non-limiting example of the term duct segment includes a cylindrical tube used to transport air such as round and oval ducts.

As used herein a non-limiting example of the term round duct segment includes a cylindrical tube used to transport air having a round circumference.

A non-limiting example of the term ductwork includes straight pieces of duct, duct segments, duct connectors, and all types of fittings.

As used herein, a non-limiting example of the term double wall duct segment includes an inner duct segment—or interior duct wall—and an outer duct segment—or exterior duct wall—separated by a layer of insulating material.

As used herein, a non-limiting example of the term adjacent duct segments includes pieces of double wall duct that are to be joined together.

As used herein, a non-limiting example of the terms gasket or gasket material includes any type of sealing or adhesive material that reduces air leakage between the joints of a ductwork.

As used herein, a non-limiting example of the term sealed connection includes a ductwork connection or joint between double wall duct segments, including the inner and outer duct segments, that has less leakage than a ductwork connection or joint without an adhesive or adhesive material between double wall duct segments and allows for the connection to be maintained without loss of shape. A non-limiting example of adhesive, which may be used to sealingly connect inner and outer double wall duct segments, is double sided tape.

As used herein, a non-limiting example of the term, the term circumferential adjustment split includes a split or cut along the axis in the duct segment or connector, thus allowing for the segment or connector's diameter to be adjusted.

Figure 1:
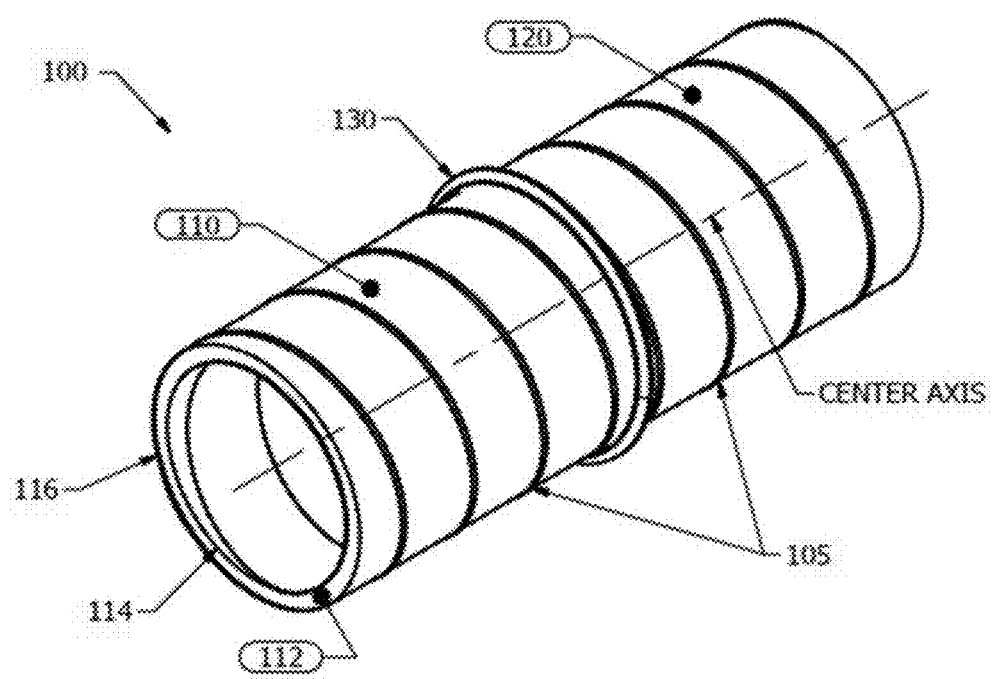
FIG. 1 is an isometric view of a pair of double wall round duct segments connected by a duct connector apparatus which is the subject of this invention.

FIG. 1 shows the assembly 100 of two double wall round duct segments 110 and 120 connected by the connecting apparatus 130. The double wall round duct segments 110 and 120 are generally cylindrical sheet metal bodies with outwardly projecting spiral ribs 105 on the outside at evenly spaced intervals along their lengths. The double wall round duct segments contain a layer of insulating material 112 between an interior duct wall 114 and an exterior duct wall 116. As later discussed in detail, the round duct segments are described as having a generally circular configuration. It should be understood, however, that the apparatus of the present invention applies also to corresponding oval duct segments.

Figure 2:
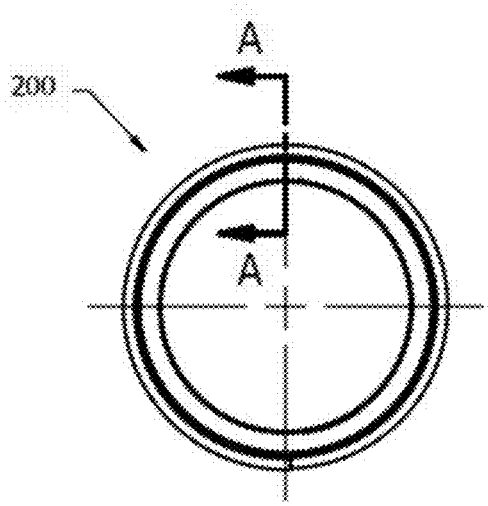
FIG. 2 is a top view along the central axis of the duct segments of FIG. 1.

FIG. 2 shows a view of apparatus 200 along the center axis parallel to the airstream in FIG. 1.

Figure 3:
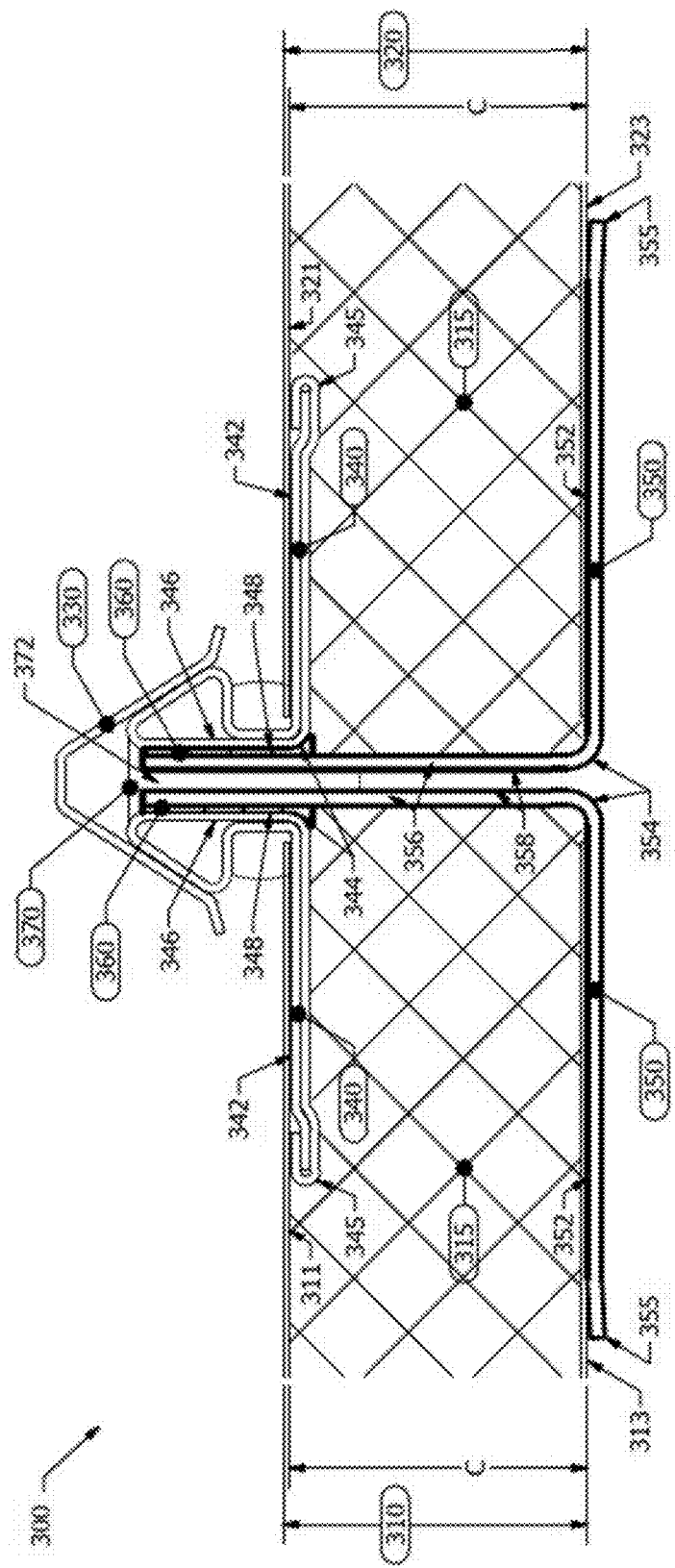
FIG. 3 is a partial sectional view taken along line A-A in FIG. 2 illustrating a pair of inner round duct connectors, each being connected via an adhesive to the corresponding outer round duct connector, and a closure ring securing the inner and outer duct connector and forming a seal between a pair of adjacent round ducts segments, with gasket material compressed between the mating inner and outer transverse flanges of the duct sections.

FIG. 3 is a sectional view illustrating the connector apparatus generally designated by the numeral 300 for connecting two double wall round duct segments 310 and 320 each having exterior duct walls 311 and 321, respectively, and interior duct walls 313 and 323, respectively. Each segment comprises two duct walls separated by insulation material 315 having an insulation thickness C. The connecting apparatus includes two outer round duct connectors 340 each having an inner leg 342. The outer round duct connectors each have at the vertex 344 an outer transverse flange 346. The outer transverse flange extends substantially perpendicularly from the inner leg 342 and has a transverse flange mating face 348 directed away from the inner leg 342. The apparatus for connecting the two round duct segments also comprises two inner round duct connectors 350 each having an inner leg 352. The inner round duct connectors each have at the vertex 354 an inner transverse flange 356. The inner transverse flange 356 substantially circumscribes the associated vertex 354 and extends substantially perpendicularly from the inner leg 352 and has a transverse flange face 358 directed toward the inner leg 352. An adhesive 360 is disposed on the transverse flange face 358 of the inner transverse flange 350. The apparatus further comprises a closure ring 330 placed over the outer transverse flanges 346 and inner transverse flanges 356 of mating duct connectors 340 and 350 with the transverse flange face 358 of each inner transverse flange sealingly connected with the transverse flange mating face 348 of each outer transverse flange by the adhesive 360. As shown in FIG. 3, the adhesive is not exposed and does not come into contact with the airstream.

A suitable amount of gasket 370 may be placed in annular void 372 to provide a sealed connection between the outer transverse flanges 346 of mating outer duct connectors 340 and/or between the inner transverse flanges 356 of mating inner duct connectors 350. As seen in FIG. 3, gasket material 370 is placed in annular void 372, and mating transverse flanges 346, which are adhesively connected to mating transverse flanges 356, are embedded in the gasket 370 upon compression under the closure ring 330. In addition to the adhesive connecting the transverse flange faces of the transverse flanges of the inner and outer duct connectors, the gasket material 370 provides an airtight seal to further ensure that air passing through the connection between round duct segments 310 and 320 does not escape through annular void 372 to the atmosphere.

As shown in the configuration illustrated in FIG. 3, the connection between the round duct segments 310 and 320 provides an excellent seal. With this configuration, the resulting connection is such that vibrations are reduced and the connection is capable of a pipe pressure of at least 18" w.g. positive and −10" w.g negative without the adhesive failing. In addition, the seal provided by the use of adhesive, which may be double sided tape, between the transverse flange faces of the inner transverse flange and the outer transverse flange of each mating inner and outer duct connector allows for the cross-sectional dimensions or diameters of adjacent duct segments 310 and 320 to be maintained without loss of shape upon connection between such segments.

When assembling adjacent duct segments 310 and 320 using inner and outer round duct connectors 350 and 340, respectively, and a closure ring 330 to provide a completed connection of a double wall round duct system assembly 300, the following steps are provided.

First, two double wall round duct segments 310 and 320 in need of connection are provided. Outer round duct connectors 340, each having an inner leg 342, a vertex 344, a leading edge 345 and an outer transverse flange 346 extending from vertex 344 of each outer duct connector 340, are also provided. The outer transverse flange 346 extends substantially perpendicularly from the inner leg 342 and has a transverse flange mating face 348 directed away from the inner leg 342. The method further comprises providing inner round duct connectors 350 each having an inner leg 352, a vertex 354, a leading edge 355, and one inner transverse flange 356 extending from vertex 354 of each inner duct connector 350. The inner transverse flange 356 substantially circumscribes the associated vertex 354 and extends substantially perpendicularly from the inner leg 352. The inner round duct connector 350 can be separate and not connected to outer round duct connector 340 when provided. The inner transverse flange 356 has a transverse flange mating face 358 directed toward the inner leg 352 and an adhesive 360 is disposed on its transverse flange mating face 358. The method further comprises the step of inserting the leading edges 345 of the outer duct connectors in the exterior duct walls 311 and 321 of round duct segments 310 and 320 in need of connection. The method then provides the step of inserting the leading edge 355 of the inner duct connectors in the interior duct walls 313 and 323 of the round duct segments 310 and 320 in need of connection. The method also comprises abutting the transverse flange mating face of the outer transverse flange 346 of the outer duct connector 340 to the adhesive 360 on the transverse flange face of the inner transverse flange 356 of the inner duct connector 350 to substantially align the inner volumes of the adjacent round duct segments 310 and 320. The method further comprises placing a closure ring 330 over the inner transverse flanges 356 and outer transverse flanges 346 of mating round duct sections 350 and 340 with the transverse flange face of the inner transverse flange 356 and the transverse flange mating face of the outer transverse flange 346 being put in contact by the adhesive 360, the closure ring may comprise fastening means, which are known in the art and may include a clamp-type mechanism, for example. The method further comprises fastening the closure ring to complete and secure the two duct segments and to form a seal between the inner air stream and outer atmosphere duct sections. The fastening of the closure ring results in compression of gasket 370 and of the adhesive 360 between the inner and outer transverse flange faces of the duct connectors thus allowing for an excellent sealing connection.

Figure 4:
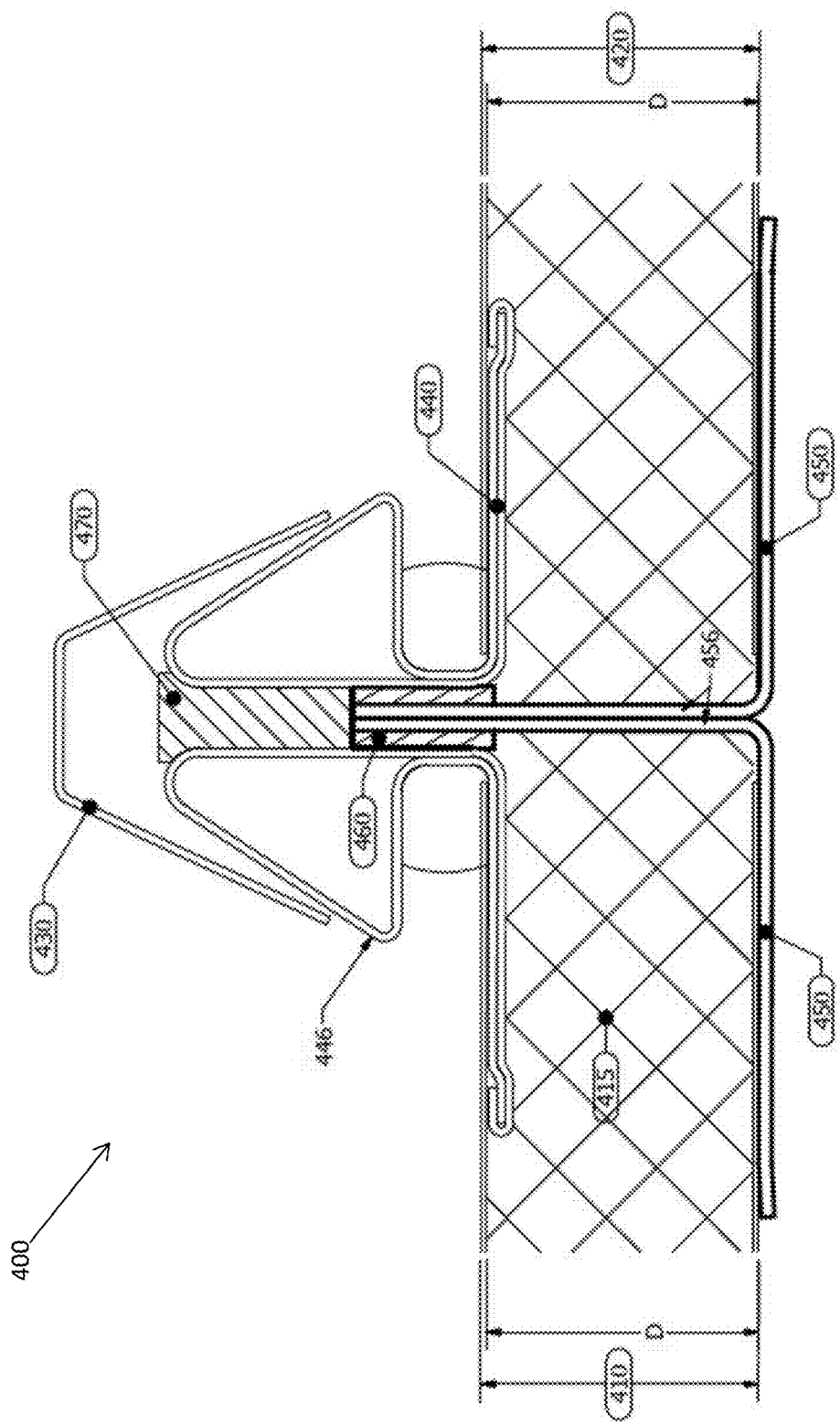
FIG. 4 is a partial sectional view of a connection apparatus similar to FIG. 3 illustrating the exposed edges of the flange of the outer duct connectors sealingly embedded in gasket material when the transverse flanges of the inner duct connectors do not match the length of the transverse flanges of the outer duct connectors.

FIG. 4 is a partial sectional view of a connection apparatus 400 similar to that shown in FIG. 3 but illustrating the exposed edges of the outer transverse flange 446 of the outer duct connectors 440 sealingly embedded in gasket material 470 when the inner transverse flanges 456 of the inner duct connectors 450 do not match the length of the outer transverse flanges 446 of the outer duct connectors 440. In this configuration, the adhesive 460 provides a sealed connection between the outer transverse flanges 346 and the corresponding inner transverse flanges 356 of mating duct connectors 340 and 350. A closure ring 430 is placed over the outer transverse flanges 346 and inner transverse flanges 356, providing a seal between round duct segments 410 and 420 having an insulation thickness D. The round duct segments may have interior 411 and exterior 413 duct walls separating the insulation material 415, with varying insulation thickness D, while still allowing the adhesive 460 to seal the inner and outer transverse flanges together as illustrated in FIG. 4.

Figure 5:
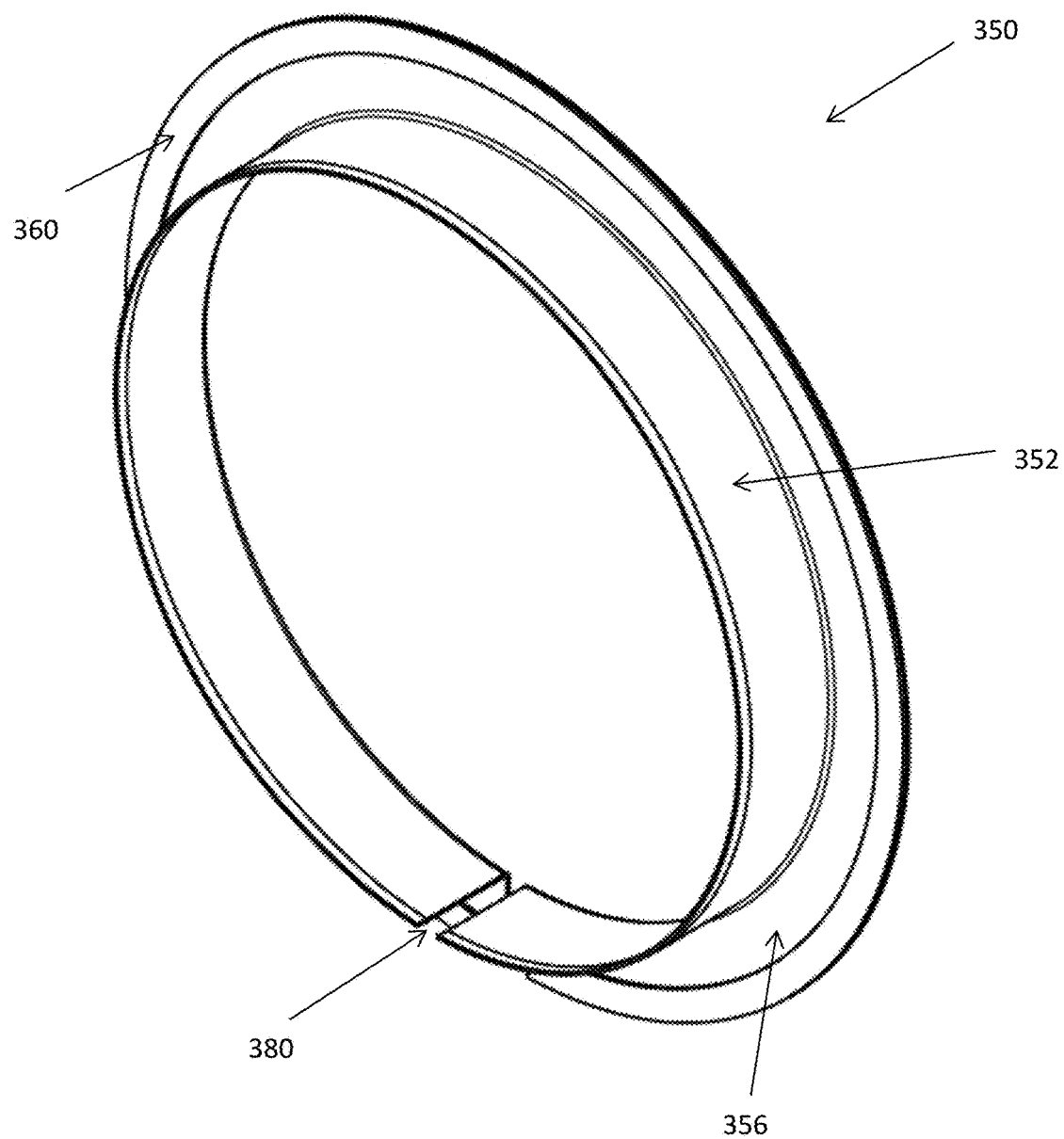
FIG. 5 is an isometric view of an inner round duct connector showing adhesive tape disposed on the outer perimeter of the face of the flange and a circumferential adjustment split in the duct connector to facilitate insertion in the duct segment in need of connection.
Figure 6:
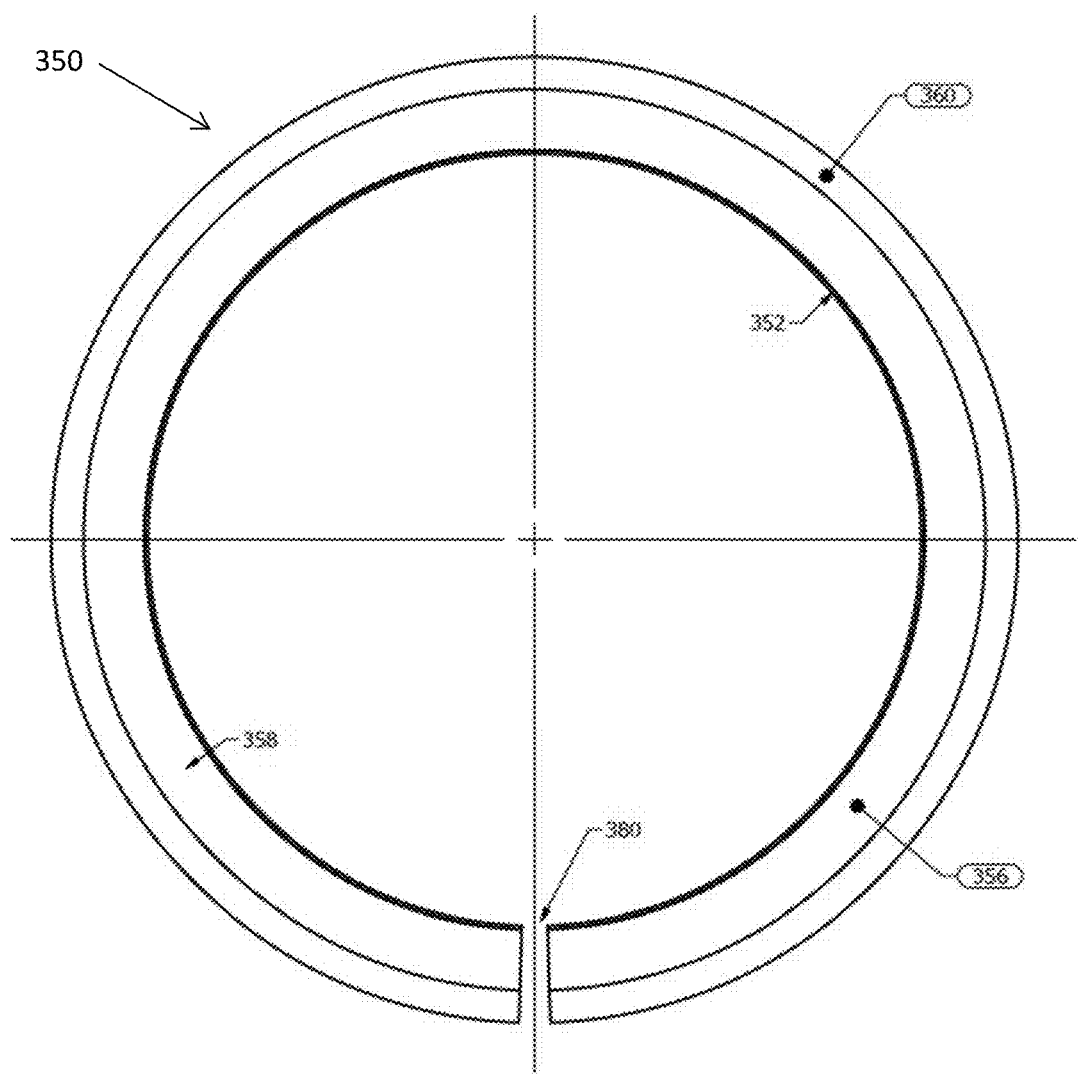
FIG. 6 is a top view of the inner duct connector of FIG. 5.

As illustrated in FIGS. 5 and 6, the inner round duct section 350 of FIG. 3 may include a circumferential adjustment split 380 allowing the inner leg 352 of the inner duct connector to be slidably positioned in the circular interior duct end portion of the round duct segment in need of connection, the circumferential adjustment split being utilized allows to increase or decrease the diameter of the duct connector, thus allowing adapting the diameter of the inner duct connector to the diameter of the corresponding round duct segment.

FIGS. 5 and 6 also illustrate the use of double-sided adhesive 360 on the inner transverse flange of the inner duct connector. In particular, the adhesive 360 may be a unitary piece disposed about the periphery of the transverse flange face of the inner transverse flange 356. Furthermore, the adhesive may be such that its surface area is smaller than the surface area of the transverse flange face 358 of the inner transverse flange and is disposed on the outer perimeter of the transverse flange face of the inner transverse flange.

Figure 7:
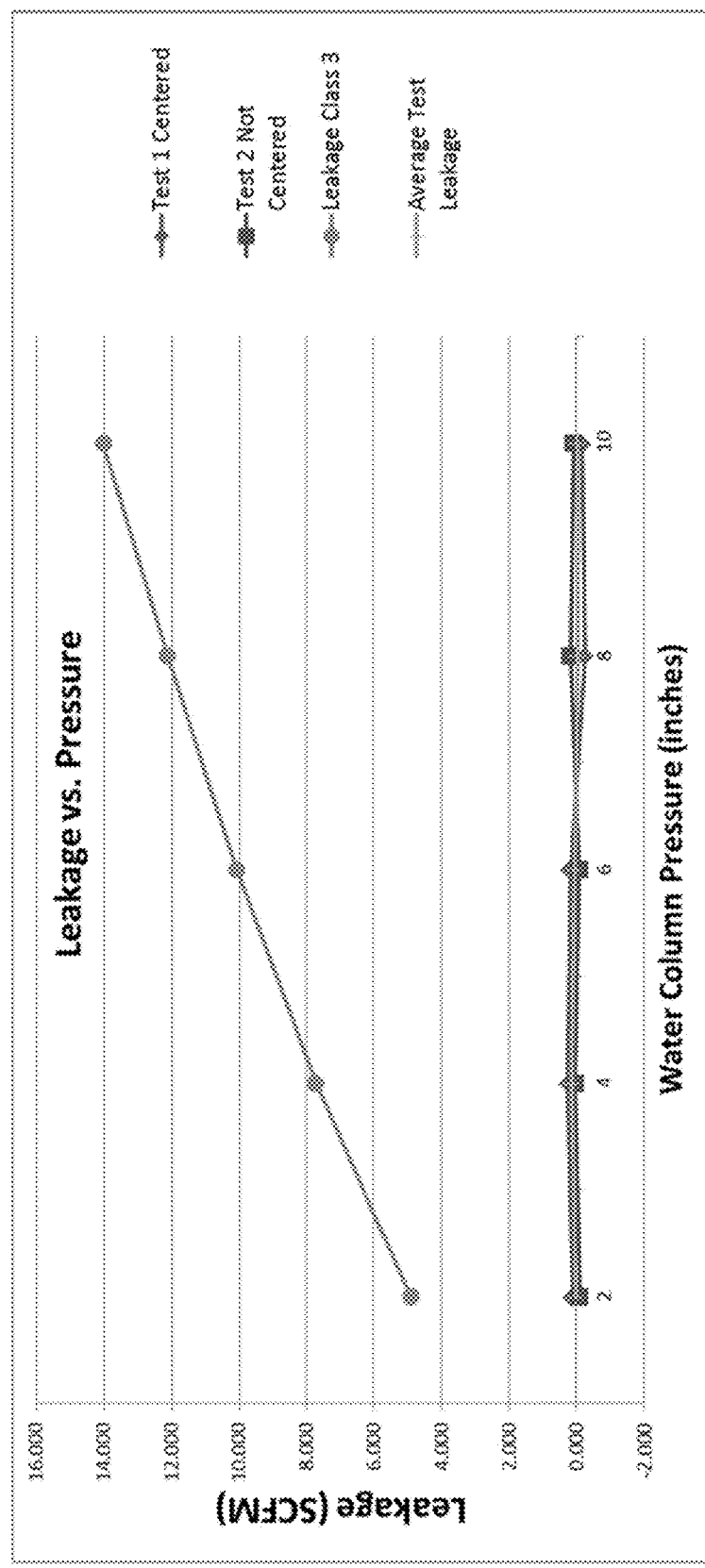
FIG. 7 is a graph representing the leakage in function of the pressure corresponding to the testing samples of Example 2.

The following examples and accompanying FIG. 7 will further explain the invention.

EXAMPLES

Example 1

Objective:
To compare the leakage of a SPIRALMATE® connection with inner ring (attached with BNGASKET) to a standard SPIRALMATE® connection (without inner ring) to determine if BNGASKET is an acceptable attachment method. This will be achieved over several tests required.
Overview:
All tests will be done with a two connection system per SMACNA requirements. The tests performed will be leakage trials for Standard SPIRALMATE® connection and Standard SPIRALMATE® connection with inner ring connected with double-sided tape/gasket. This will be trialed for both small and large profile SPIRALMATE® connections.
Materials & Instrumentation:
The following material and instrumentation were used:
(3×) 10" Dia×2' Long, round spiral pipe
(3×) 40" Dia×2' Long, round spiral pipe
Cadillac Products blower unit, Model: HP33P
Meriam laminar flow element, Model: 50MC2-2, Range: 0-20 psi
Extech Differential Pressure Manometer, Model: HD700, Range: 0-2 psi
Retrotec Digital Manometer, Model: DM32, Range −3 to +3 inches of WC
Bullnose neoprene gasket tape 1/16" Thk×3/4" Wide, PN: BNGASKET
PROseal® duct sealant, PN: PROSEAL1
Butyl tape 440, PN: 440 3/16×5/8
SPIRALMATE® gasket material, PN: NEO 5/16×3/4

Test Samples:

The following are the test samples described herein:

(4×) 10" Dia small profile SPIRALMATE® complete connections w/inner rings (4×) 40" Dia large profile SPIRALMATE® complete connections w/inner rings Installation Connect the Cadillac Products blower unit to the Meriam laminar flow element then to the duct mock-up. Make sure the Extech Differential Pressure Manometer is connected to the Meriam laminar flow element and the Retrotec Digital Manometer is ported into the beginning of the duct mock-up (see FIGS. 5-2 page 5-3 in the "SMACNA HVAC Air Duct Leakage Test Manual," incorporated by reference in its entirety herein).

The duct mock-up will consist of three sections equivalent in length connected together by the SPIRALMATE® trials that are attached with #10 Tek screws around the circumference and sealed. Make sure all joints, not including the actual SPIRALMATE® connection, are sealed with proper sealant to avoid leaks.

Test Procedural Definitions:

Use the Cadillac Products blower unit to induce a positive and negative pressure inside the duct mock-up. Use the Meriam laminar flow element to measure the airflow at −10 in and +10 in WG pressure in increments. Repeat this for all connections.

Test and record the large standard SPIRALMATE® connection. Assemble as listed in the installation instructions on the product spec sheet.

Test and record the large standard SPIRALMATE® connection with the inner ring attached using BNGASKET to connect it (attach in segments of tape approx. 3.0" long eq. spaced, 8 pcs). Assemble as listed in the installation instructions on the product spec sheet.

Test and record the small standard SPIRALMATE® connection. Assemble as listed in the installation instructions on the product spec sheet.

Test and record the small standard SPIRALMATE® connection with the inner ring attached using BNGASKET to connect it (attach in segments of tape approx. 3.0" long eq. spaced, 4 pcs). Assemble as listed in the installation instructions on the product spec sheet.

Test Results

The test results are provided in the following Tables (Tables 1-4) and accompanying Figures (FIGS. 7-11).

TABLE 1

10" Diameter

| | 10" Dia. Std. connection Test pressure (IN of H2O) | | | | | |
|---|---|---|---|---|---|---|
| | 0.5 | 1 | 2 | 4 | 8 | 10 |
| Positive pressure CFM reading | 3.199 | 4.526 | 6.257 | 8.589 | 11.884 | 13.224 |
| Positive pressure CFM Tare | 3.284 | 4.471 | 6.364 | 8.570 | 12.001 | 13.457 |
| Leakage | −0.085 | 0.055 | −0.107 | 0.019 | −0.117 | −0.233 |
| Leakage Class | −0.85 | 0.35 | −0.43 | 0.05 | −0.19 | −0.33 |
| Negative pressure CFM reading | 2.854 | 4.047 | 5.848 | 8.275 | 12.058 | 13.450 |
| Negative pressure CFM Tare | 2.920 | 4.168 | 5.906 | 8.218 | 11.840 | 13.188 |
| Leakage | −0.066 | −0.121 | −0.059 | 0.057 | 0.217 | 0.261 |
| Leakage Class | −0.66 | −0.77 | −0.24 | 0.15 | 0.36 | 0.37 |

Leakage was only detected at 2 screws with soapy water.

TABLE 2

| | 10" Dia. Std. connection w/ Inner Ring & BNGASKET Test pressure (IN of H2O) | | | | | |
|---|---|---|---|---|---|---|
| | 0.5 | 1 | 2 | 4 | 8 | 10 |
| Positive pressure CFM reading | 2.961 | 4.511 | 5.744 | 7.756 | 10.552 | 11.596 |
| Positive pressure CFM Tare | 2.985 | 4.160 | 5.682 | 7.895 | 10.611 | 11.555 |
| Leakage | −0.024 | 0.351 | 0.061 | −0.140 | −0.059 | 0.041 |
| Leakage Class | −0.24 | 2.24 | 0.25 | −0.36 | −0.10 | 0.06 |
| Negative pressure CFM reading | 2.891 | 4.027 | 5.722 | 8.045 | 11.621 | 13.181 |
| Negative pressure CFM Tare | 2.712 | 3.903 | 5.563 | 7.942 | 11.526 | 12.977 |
| Leakage | 0.179 | 0.123 | 0.159 | 0.103 | 0.095 | 0.204 |
| Leakage Class | 1.78 | 0.78 | 0.65 | 0.27 | 0.16 | 0.29 |

Leakage only detected at 2 screws and at one spot at each connection with soapy water

TABLE 3

36" Diameter

| | 36" Dia. Std. connection Test pressure (IN of H2O) | | | | | |
|---|---|---|---|---|---|---|
| | 0.5 | 1 | 2 | 4 | 8 | 10 |
| Positive pressure CFM reading | 2.827 | 3.742 | 5.110 | 6.749 | 9.109 | 10.110 |
| Positive pressure CFM Tare | 2.754 | 3.748 | 5.149 | 6.830 | 9.151 | 10.054 |
| Leakage | 0.073 | −0.006 | −0.039 | −0.081 | −0.042 | 0.057 |
| Leakage Class | 0.20 | −0.01 | −0.04 | −0.06 | −0.02 | 0.02 |
| Negative pressure CFM reading | 2.671 | 3.842 | 5.367 | 7.615 | 11.068 | 12.285 |
| Negative pressure CFM Tare | 2.678 | 3.822 | 5.367 | 7.615 | 11.007 | 12.254 |
| Leakage | −0.007 | 0.020 | 0.000 | 0.000 | 0.061 | 0.031 |
| Leakage Class | −0.02 | 0.04 | 0.00 | 0.00 | 0.03 | 0.01 |

No Leakage detected with soapy water

TABLE 4

| | 36" Dia. Std. connection w/ Inner Ring & BNGASKET Test pressure (IN of H2O) | | | | | |
|---|---|---|---|---|---|---|
| | 0.5 | 1 | 2 | 4 | 8 | 10 |
| Positive pressure CFM reading | 2.774 | 3.811 | 5.233 | 7.080 | 9.608 | 10.763 |
| Positive pressure CFM Tare | 2.883 | 3.889 | 5.208 | 7.056 | 9.302 | 10.645 |
| Leakage | −0.110 | −0.078 | 0.025 | 0.024 | 0.307 | 0.118 |
| Leakage Class | −0.30 | −0.14 | 0.03 | 0.02 | 0.14 | 0.05 |
| Negative pressure CFM reading | 2.664 | 3.788 | 5.387 | 7.861 | 11.153 | 12.495 |
| Negative pressure CFM Tare | 2.582 | 3.680 | 5.276 | 7.650 | 10.901 | 12.169 |
| Leakage | 0.082 | 0.107 | 0.111 | 0.211 | 0.252 | 0.326 |
| Leakage Class | 0.23 | 0.19 | 0.12 | 0.15 | 0.12 | 0.13 |

Leakage was only detected at one Flange where Alignment tool was used and mastic was pulled out.

Conclusions

The results of this round of testing were much more consistent and accurate than the first attempt. Minimal leakage was observed (if any) in every test sample. For 10" diameter connections, leakage values ranged from −0.233 to 0.351 CFM, with negligible differences between connections with and without the inner rings. For 36" diameter connections, leakage values ranged from −0.110 to 0.326 CFM, with negligible differences between connections with and without inner rings.

Negative leakage values typically result from an inaccurate tare due to % error in equipment or inherent uncontrollable variables in the system. All leakage values are low enough to conclude that there were no major flaws in the system or the test method. Additionally, it was evident that there are no major differences (in terms of leakage) between the two sizes (10" & 36") or between the types of connections (with and without inner rings).

Overall, BNGASKET adhered better than the other tapes (trialed in first round of tests). Due to the cost and overall performance, it was determined that BNGASKET serves as an acceptable method for attaching the inner ring to the SPIRALMATE® flange.

Example 2

Objective:

There are two primary objectives to this series of tests. First is to compare the leakage of a SPIRALMATE® connection with centered inner rings (attached with ½" PSA Tape) using double-wall duct to a similar connection with non-centered inner rings. Second is to compare the leakage of a SPIRALMATE® connection using double-wall duct where flange and inner ring splices are misaligned vs. aligned.

Overview:

All tests will be done with a one-connection system. The tests performed will be leakage trials for a standard SPIRALMATE® connection with inner rings attached (concentric vs. non-concentric & aligned vs. misaligned splices) using ½" double-sided tape/gasket. Only large profile SPIRALMATE® connections will be used, due to the diameter of duct being tested. The application of the inner rings on large diameter double-wall duct will also be trialed for determining difficulty.

Materials & Instrumentation:

The following material and instrumentation were used:
(2×) 40" Dia.×10' Long, round spiral double-wall duct
Cadillac Products blower unit, Model: HP33P
Meriam laminar flow element, Model: 50MC2-2, Range: 0-20 psi
Extech Differential Pressure Manometer, Model: HD700, Range: 0-2 psi
Retrotec Digital Manometer, Model: DM32, Range −3 to +3 inches of WC
Bull nose neoprene gasket tape: 1/16" Thick×½" Wide
ProSeal duct sealant, PN: PROSEAL1
Butyl tape 440, PN: 440 3/16×5/8
SPIRALMATE® gasket material, PN: NEO 5/16×3/4

Test Samples:
(2×) 40" Dia. large profile SPIRALMATE® connection w/inner rings

Installation:

Connect the Cadillac Products blower unit to the Meriam laminar flow element then to the duct mock-up. Make sure the Extech Differential Pressure Manometer is connected to the Meriam laminar flow element and the Retrotec Digital Manometer is ported into the beginning of the duct mock-up (see FIG. 5-2 page 5-3 in the "SMACNA HVAC Air Duct Leakage Test Manual").

The duct mock-up will consist of two sections equivalent in length connected together using the SPIRALMATE® system, attached with #10 Tek screws around the circumference and sealed. Make sure all joints, not including the actual SPIRALMATE® connection, are sealed with proper sealant to avoid leaks.

Test Procedural Definitions:

Use the Cadillac Products blower unit to induce a positive and negative pressure inside the duct mock-up. Use the Meriam laminar flow element to measure the airflow between −10 in and +10 in WG pressure in 2-in increments. Repeat this for all connections.

Test and record leakage of the large SPIRALMATE® connection with non-centered inner ring and aligned splices, using ½" PSA tape.

Test and record leakage of the large SPIRALMATE® connection with centered inner ring and misaligned flange & inner ring splices, using ½" PSA tape.

Test Results:

The test results are provided in Table 1 and accompanying FIG. 12.

TABLE 1

| SPIRALMATE ® Inner Ring Leakage Testing | | | | | | |
|---|---|---|---|---|---|---|
| SIZE | 40" Double-wall | | | | | |
| Pressure (inches w.g.) | 2 | 4 | 6 | 8 | 10 | Test # |
| SCFM Leakage (CFM; less TARE) | 0.122 | 0.267 | 0.190 | −0.239 | −0.164 | 1: Centered; Misaligned |
| Leakage Class | 0.074 | 0.104 | 0.057 | −0.059 | −0.035 | |
| SCFM Leakage (CFM; less TARE) | −0.081 | 0.056 | −0.068 | 0.183 | 0.099 | 2: Not Centered; |
| Leakage Class | −0.049 | 0.022 | −0.020 | 0.045 | 0.021 | Aligned |
| Σ | 0.062 | 0.041 | 0.038 | 0.052 | 0.028 | |
| Average (SCFM) | 0.020 | 0.161 | 0.061 | −0.028 | −0.032 | |
| Average Class | 0.012 | 0.063 | 0.018 | −0.007 | −0.007 | |
| Leakage Class 3 (SCFM) | 4.927 | 7.732 | 10.063 | 12.132 | 14.026 | |

Conclusions

Based on the above data and the graph of FIG. 12, it appears that there is no noticeable difference (in terms of leakage) between the centered/misaligned system and the non-centered/aligned system. With leakage values this low, considering the error in accuracy of the measuring equipment itself, leakage differences between the different (tested) assembly methods can be considered negligible.

When attaching the inner ring to the SPIRALMATE® flange, it is much easier to allow the inner ring to follow its natural shape, rather than trying to bend the ring to follow the flange edge. Due to the weight of the inner duct wall and insulation, it was somewhat difficult to force the inner ring to conform to the imperfections of the duct to keep it concentric. This seems to be more apparent as the duct diameter increases and the duct profile takes on more of an oval shape. However, as shown by the test, forcing the inner ring to be concentric with the duct does not affect leakage to a measurable degree.

Various changes could be made in the above apparatus and method without departing from the scope of the invention as defined in the claims below. It is intended that all matter contained in the above description, as shown in the accompanying drawings, shall be interpreted as illustrative and not as a limitation.

I claim:

1. An apparatus for connecting adjacent double wall round or oval duct segments comprising:
   (a) outer round or oval duct connectors each having an inner leg, a leading edge, a vertex and an outer transverse flange extending from the vertex of each outer duct connector, the outer transverse flange extending substantially perpendicularly from the inner leg and having a transverse flange mating face directed away from the inner leg;
   (b) inner round or oval duct connectors each having an inner leg, a leading edge, a vertex and an inner transverse flange extending from the vertex of each inner duct connector, the inner transverse flange substantially circumscribing the associated vertex, the inner transverse flange extending substantially perpendicularly from the inner leg and having a transverse flange face directed toward the inner leg, and an adhesive disposed on the transverse flange face of the inner transverse flange; and
   (c) a closure ring placed over the outer transverse flanges and inner transverse flanges of mating duct connectors with the transverse flange face of the inner transverse flange and the transverse flange mating face of the outer transverse flange being maintained in contact by the adhesive.

2. The apparatus of claim 1, wherein the adhesive is a double-sided adhesive.

3. The apparatus of claim 1, wherein the adhesive is a unitary piece disposed about the periphery of the transverse flange face of the inner transverse flange.

4. The apparatus of claim 1, wherein the adhesive surface area is smaller than the surface area of the transverse flange face of the inner transverse flange and is disposed on the outer perimeter of the transverse flange face of the inner transverse flange.

5. The apparatus of claim 1, wherein the inner duct connector comprises a circumferential adjustment split to modify the cross-sectional dimension of the inner duct connector.

6. The apparatus of claim 5, wherein the circumferential adjustment split of the inner duct connector allows for connection of metal duct sections having different cross-sectional dimensions.

7. The apparatus of claim 1, wherein the adhesive is not exposed and does not come into contact with the airstream.

8. The apparatus of claim 1, wherein the connection between the double wall round or oval duct segments provides a fit so that vibrations are reduced.

9. The apparatus of claim 1, wherein the metal duct connection is capable of a pipe pressure of at least 18" w.g. positive and −10" w.g negative without the adhesive failing.

10. The apparatus of claim 1, wherein the metal duct connection maintains the round or oval cross-sectional dimensions of the adjacent duct segments upon installation.

11. A method for connecting adjacent double wall round or oval spiral duct segments comprising:
   (a) providing double wall round or oval duct segments in need of connection;
   (b) providing outer round or oval duct connectors each having an inner leg, a leading edge, a vertex and an outer transverse flange extending from the vertex of each outer duct connector, the outer transverse flange extending substantially perpendicularly from the inner leg and having a transverse flange mating face directed away from the inner leg;
   (c) providing inner round or oval duct connectors each having an inner leg, a leading edge, a vertex and one inner transverse flange extending from the vertex of each inner duct connector, the inner transverse flange substantially circumscribing the associated vertex, the inner transverse flange extending substantially perpendicularly from the inner leg and having a transverse flange face directed toward the inner leg, and an adhesive disposed on the transverse flange face of the inner transverse flange;
   (d) inserting the leading edges of the outer duct connectors in the round or oval duct segments in need of connection;
   (e) inserting the leading edges of the inner duct connectors in the round or oval duct segments in need of connection;
   (f) abutting the outer transverse flange of the outer duct connector to the adhesive of the inner transverse flange of the inner duct connector to substantially align the inner volumes of the adjacent duct segments;
   (g) placing a closure ring over the inner transverse flanges and outer transverse flanges of mating duct connectors with the transverse flange face of the inner transverse flange and the transverse flange mating face of the outer transverse flange being put in contact by the adhesive, the closure ring comprising fastening means; and
   (h) fastening the closure ring to form a seal between the inner and outer duct connectors.

12. The method of claim 11, wherein the adhesive is a double-sided adhesive.

13. The method of claim 11, wherein the adhesive is a unitary piece disposed about the periphery of the transverse flange face of the inner transverse flange.

14. The method of claim 11, wherein the adhesive surface area is smaller than the surface area of the transverse flange face of the inner transverse flange and is disposed on the outer perimeter of the transverse flange face of the inner transverse flange.

15. The method of claim 11, wherein the inner duct connector comprises a circumferential adjustment split to modify the cross-sectional dimension of the inner duct connector.

16. The method of claim 11, further comprising the step of adapting the cross-sectional dimensions of the inner and outer duct connectors to the cross-sectional dimensions of the duct segments via circumferential adjustment splits in the inner and outer duct connectors.

17. The method of claim 11, wherein the adhesive is not exposed and does not come into contact with the airstream.

18. The method of claim 11, wherein the step of fastening the closure ring further allows for a connection resulting in reduced vibrations.

19. The method of claim 11, wherein the metal duct connection is capable of a pipe pressure of at least 18" w.g. positive and −10" w.g negative without the adhesive failing.

20. The method of claim 11, wherein the method further comprises maintaining the cross-sectional dimensions of the adjacent double wall round duct segments at the connection.

21. The method of claim 11, further comprising the step of inserting a gasket between the outer transverse flanges of the outer duct connectors and/or the inner transverse flanges of the inner duct connectors.

\* \* \* \* \*